US012784249B2

(12) United States Patent
Uchida et al.

(10) Patent No.: US 12,784,249 B2
(45) Date of Patent: Nov. 3, 2026

(54) IMAGE PROCESSING DEVICE AND IMAGE PROCESSING METHOD

(71) Applicant: Hitachi Astemo, Ltd., Hitachinaka (JP)

(72) Inventors: Yusuke Uchida, Tokyo (JP); Keisuke Inata, Tokyo (JP); Masashi Takada, Hitachinaka (JP); Shinichi Nonaka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 244 days.

(21) Appl. No.: 18/838,665

(22) PCT Filed: Apr. 12, 2023

(86) PCT No.: PCT/JP2023/014886

§ 371 (c)(1),
(2) Date: Aug. 15, 2024

(87) PCT Pub. No.: WO2023/218844

PCT Pub. Date: Nov. 16, 2023

(65) Prior Publication Data

US 2025/0173885 A1 May 29, 2025

(30) Foreign Application Priority Data

May 10, 2022 (JP) ................................ 2022-077643

(51) Int. Cl.
*G06K 9/00* (2022.01)
*G06T 7/593* (2017.01)

(52) U.S. Cl.
CPC .... *G06T 7/593* (2017.01); *G06T 2207/10012* (2013.01)

(58) Field of Classification Search
CPC ...................... G06T 7/593; G06T 2207/10012
See application file for complete search history.

(56) References Cited

U.S. PATENT DOCUMENTS 5,220,441 A * 6/1993 Gerstenberger ........ G06T 7/593 348/42
6,163,337 A * 12/2000 Azuma ..................... G06T 7/97 348/E13.071

(Continued)

FOREIGN PATENT DOCUMENTS

CN 104079912 A * 10/2014 ........... H04N 13/128
EP 3 933 340 A1 1/2022

(Continued)

OTHER PUBLICATIONS

International Search Report (PCT/ISA/210) issued in PCT Application No. PCT/JP2023/014886 dated May 23, 2023 with English translation (5 pages).

(Continued)

*Primary Examiner* — Shervin K Nakhjavan
(74) *Attorney, Agent, or Firm* — Crowell & Moring LLP

(57) ABSTRACT

The invention is directed to an image processing device performs a first layer matching processing for obtaining a first parallax in units of an image region of a first size by specifying an image block having the high similarity to a first image block provided in one of two images from a first search range based on a first predetermined search width in the other image and a second layer matching processing for obtaining a second parallax in units of an image region of a second size by specifying an image block having the high similarity to a second image block provided in one image of the two images from a second search range based on the first parallax and a predetermined second search width in the other image, and expands the first search width or the second search range and performs a search when an image block having the high similarity to the first image block exists at an end of the first search range, in the first layer stereo matching processing.

12 Claims, 10 Drawing Sheets

(56) References Cited

U.S. PATENT DOCUMENTS

| | | | | |
|---|---|---|---|---|
| 6,366,691 | B1 * | 4/2002 | Sogawa | G06T 7/593 382/154 |
| 7,471,809 | B2 * | 12/2008 | Miyazaki | G06T 7/593 382/107 |
| 7,697,749 | B2 * | 4/2010 | Ogawa | G06V 10/24 382/103 |
| 9,785,854 | B2 * | 10/2017 | Segawa | G06F 3/0304 |
| 10,559,089 | B2 | 2/2020 | Inada et al. | |
| 11,889,047 | B2 * | 1/2024 | Kuraoka | G06T 7/593 |
| 2018/0189975 | A1 | 7/2018 | Inada et al. | |
| 2019/0058811 | A1 * | 2/2019 | Douady-Pleven | G06T 3/18 |

FOREIGN PATENT DOCUMENTS

| | | | | |
|---|---|---|---|---|
| EP | 3 933 341 | A1 | 1/2022 | |
| EP | 3 933 340 | A4 | 11/2022 | |
| EP | 3 933 341 | A4 | 11/2022 | |
| EP | 3 933 340 | B1 | 1/2024 | |
| EP | 3 933 341 | B1 | 5/2024 | |
| JP | H08294143 | A * | 11/1996 | G06T 7/593 |
| JP | 2001-319229 | A | 11/2001 | |
| JP | 2017-45283 | A | 3/2017 | |
| JP | 2020-140344 | A | 9/2020 | |
| JP | 2020-140497 | A | 9/2020 | |
| WO | WO-2020175063 | A1 * | 9/2020 | H04N 13/271 |
| WO | WO-2022118442 | A1 * | 6/2022 | G06T 7/00 |

OTHER PUBLICATIONS

Japanese-language Written Opinion (PCT/ISA/237) issued in PCT Application No. PCT/JP2023/014886 dated May 23, 2023 with English translation (7 pages).

* cited by examiner

[FIG. 1]
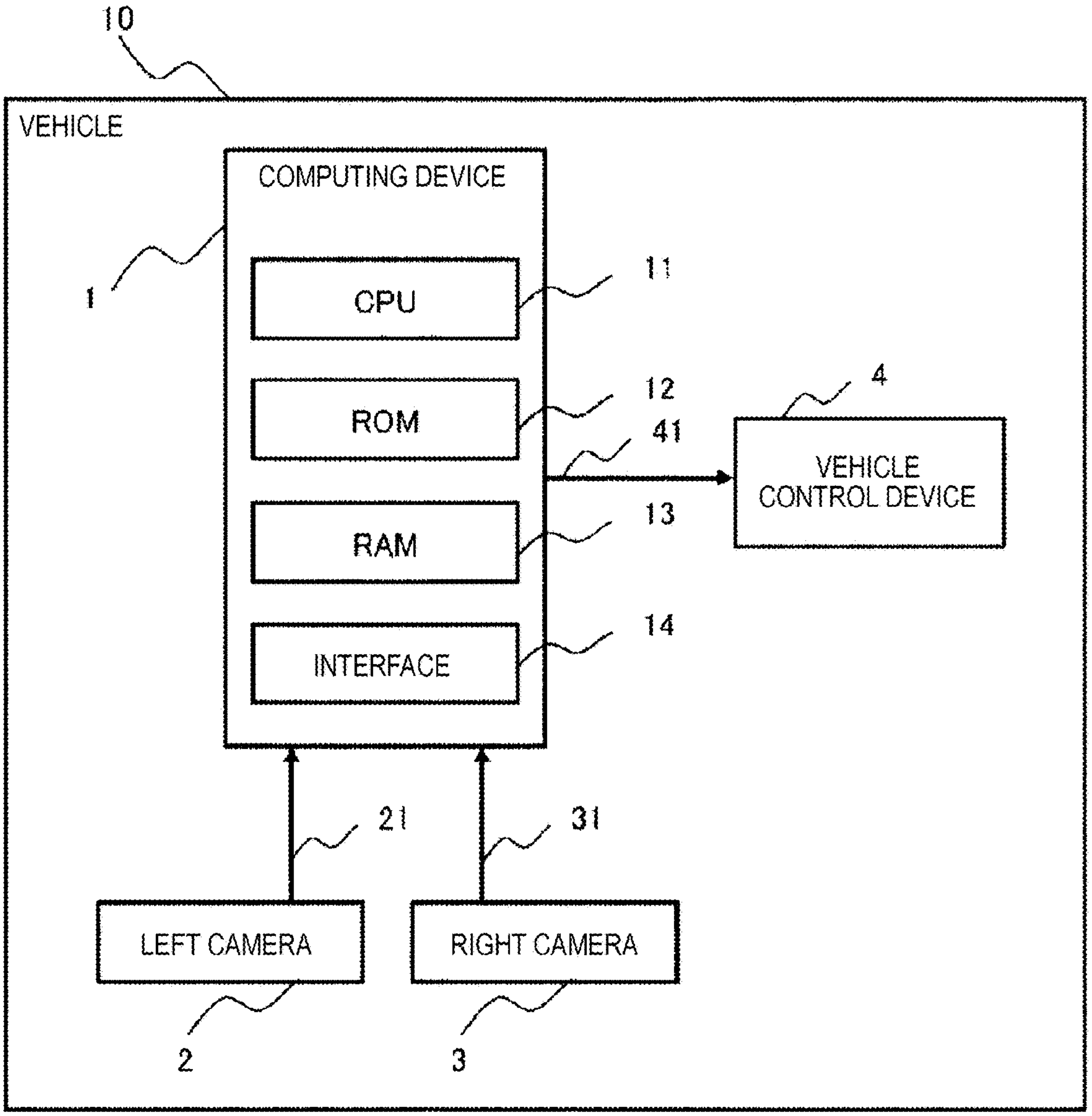

[FIG. 2]
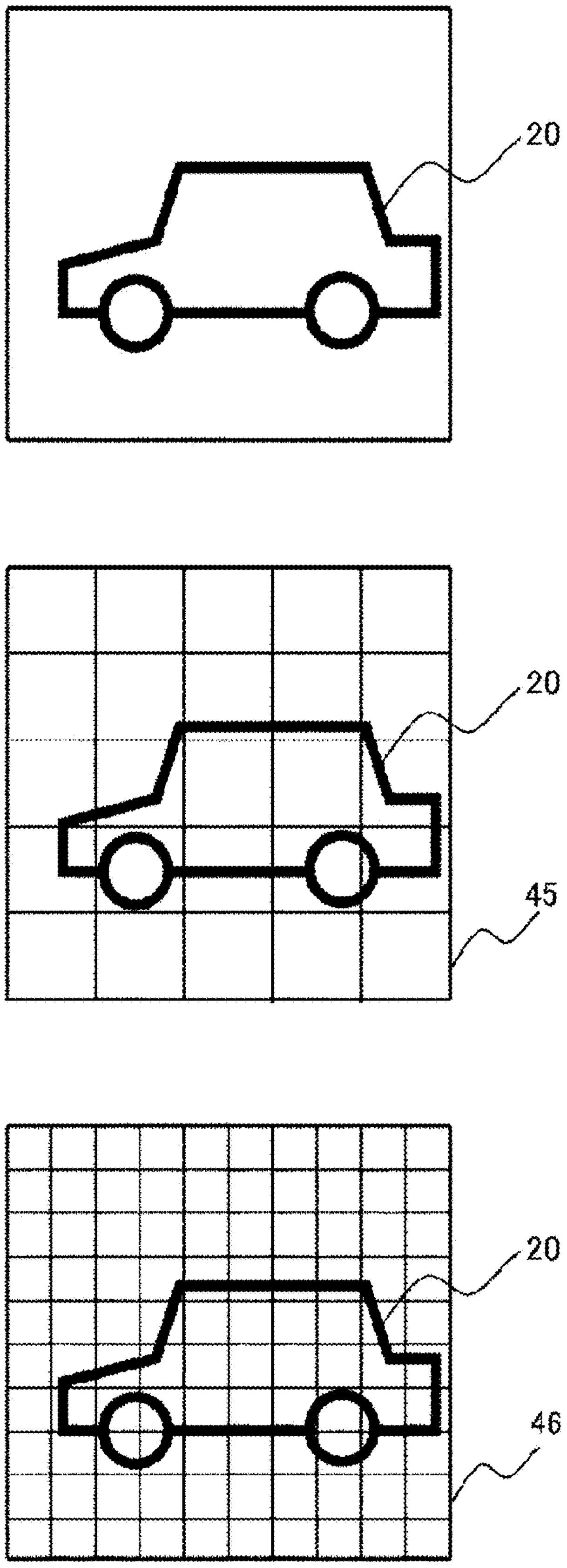

[FIG. 3]
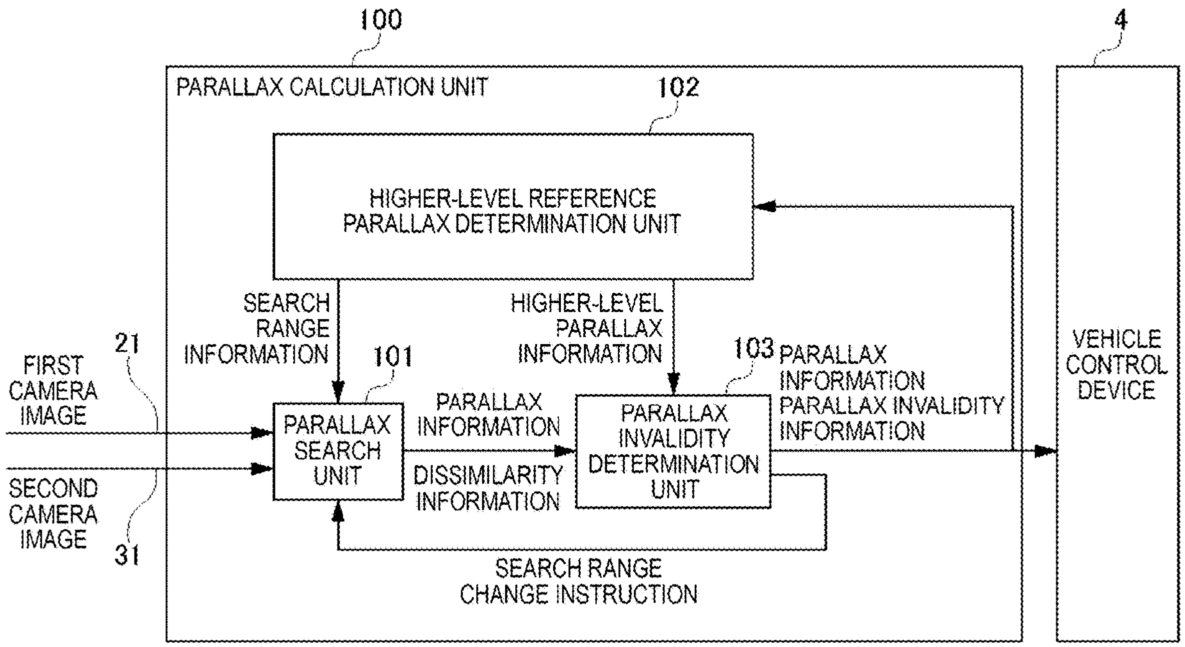

[FIG. 4]
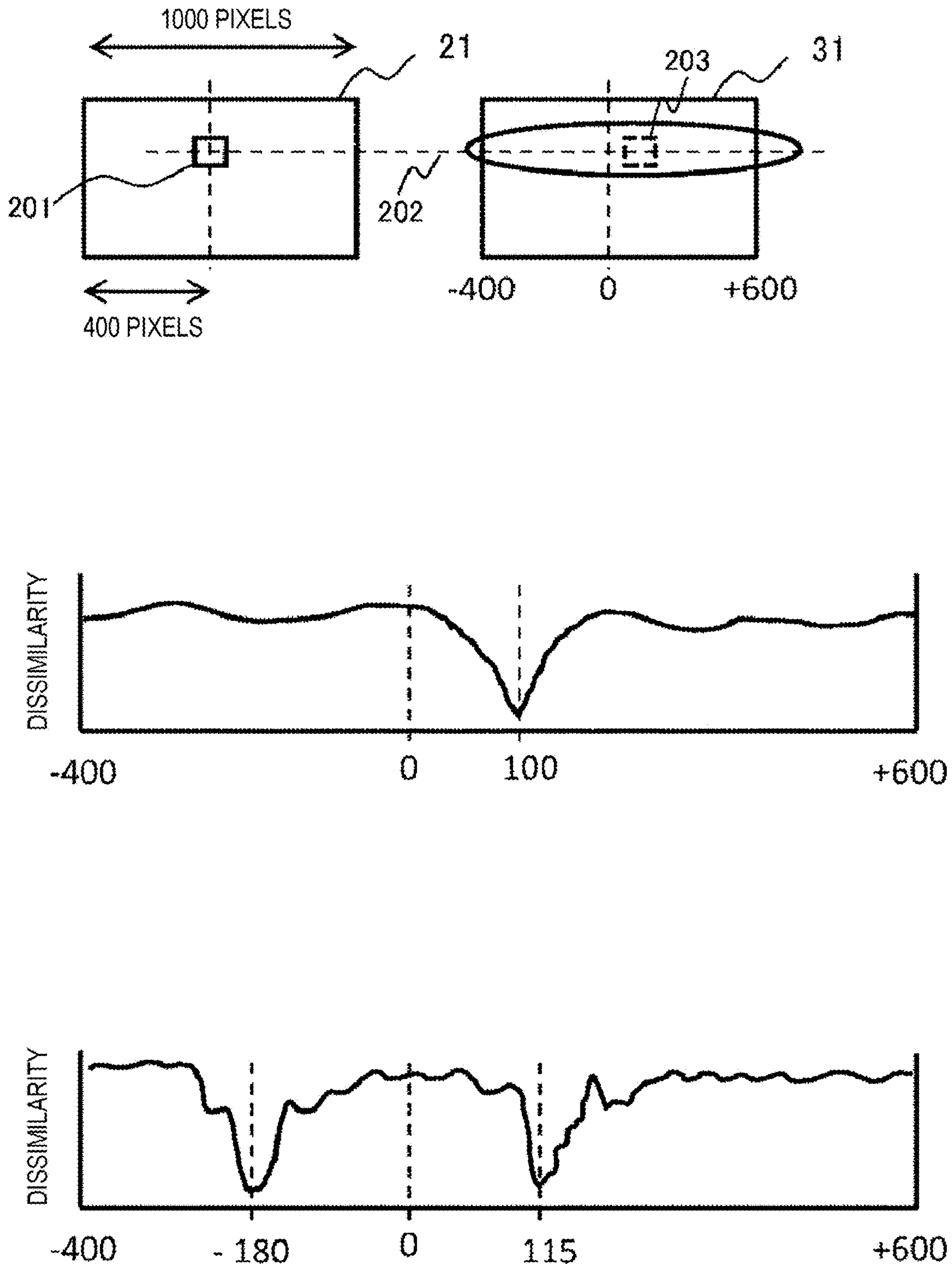

[FIG. 5]
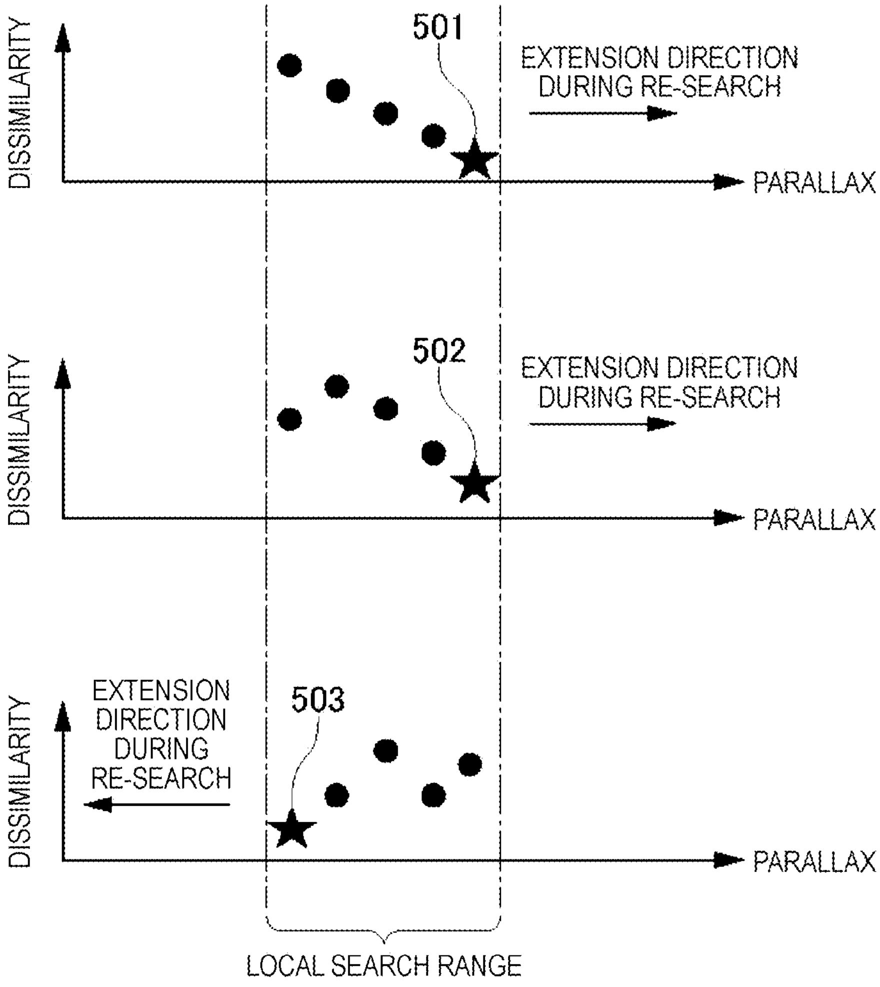

[FIG. 6]
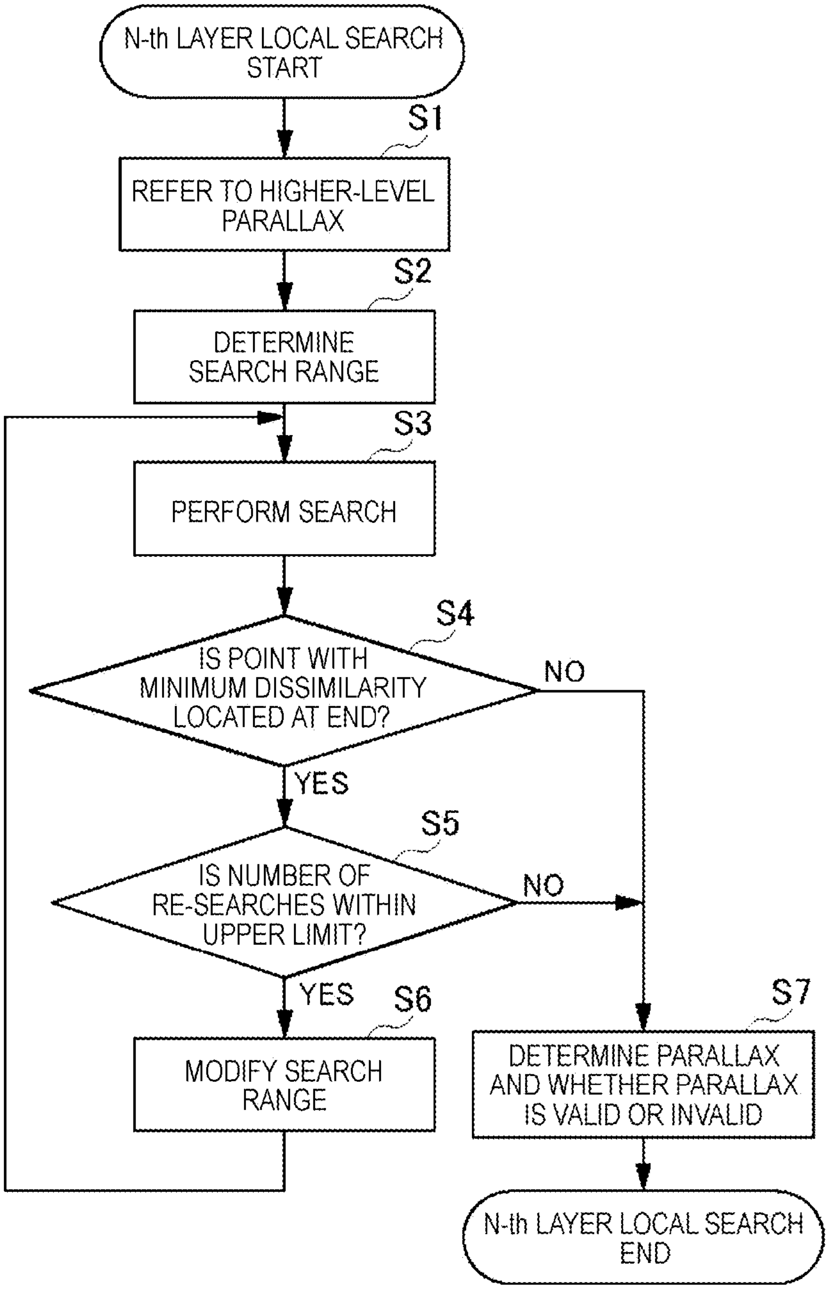

[FIG. 7]
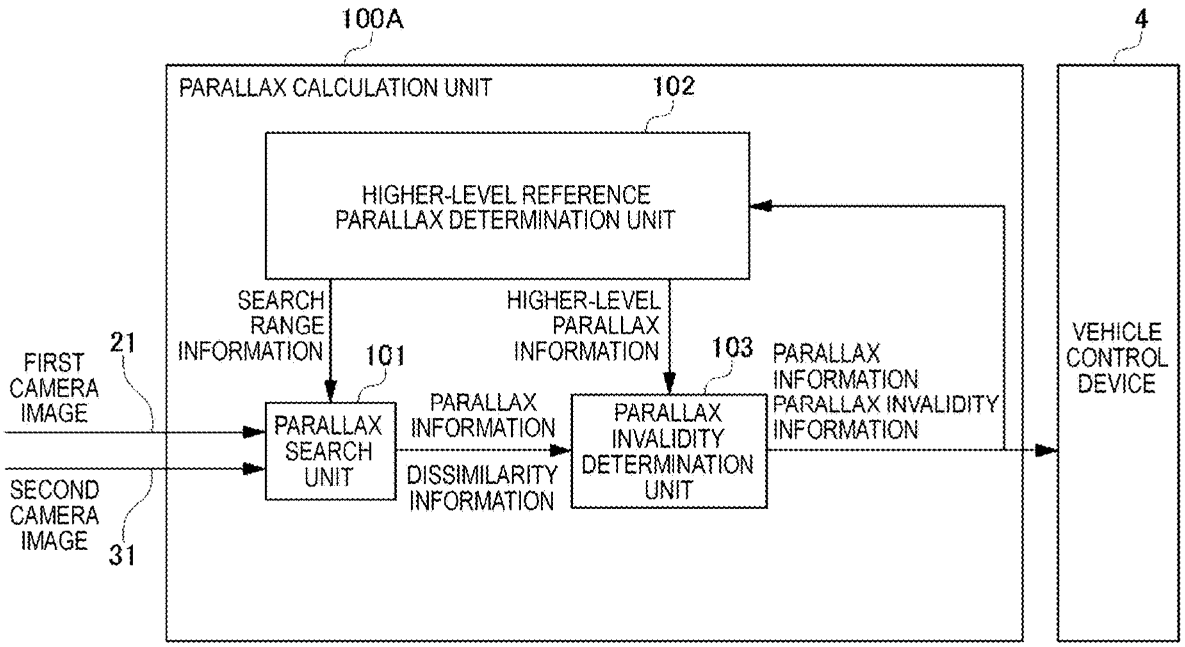

[FIG. 8]
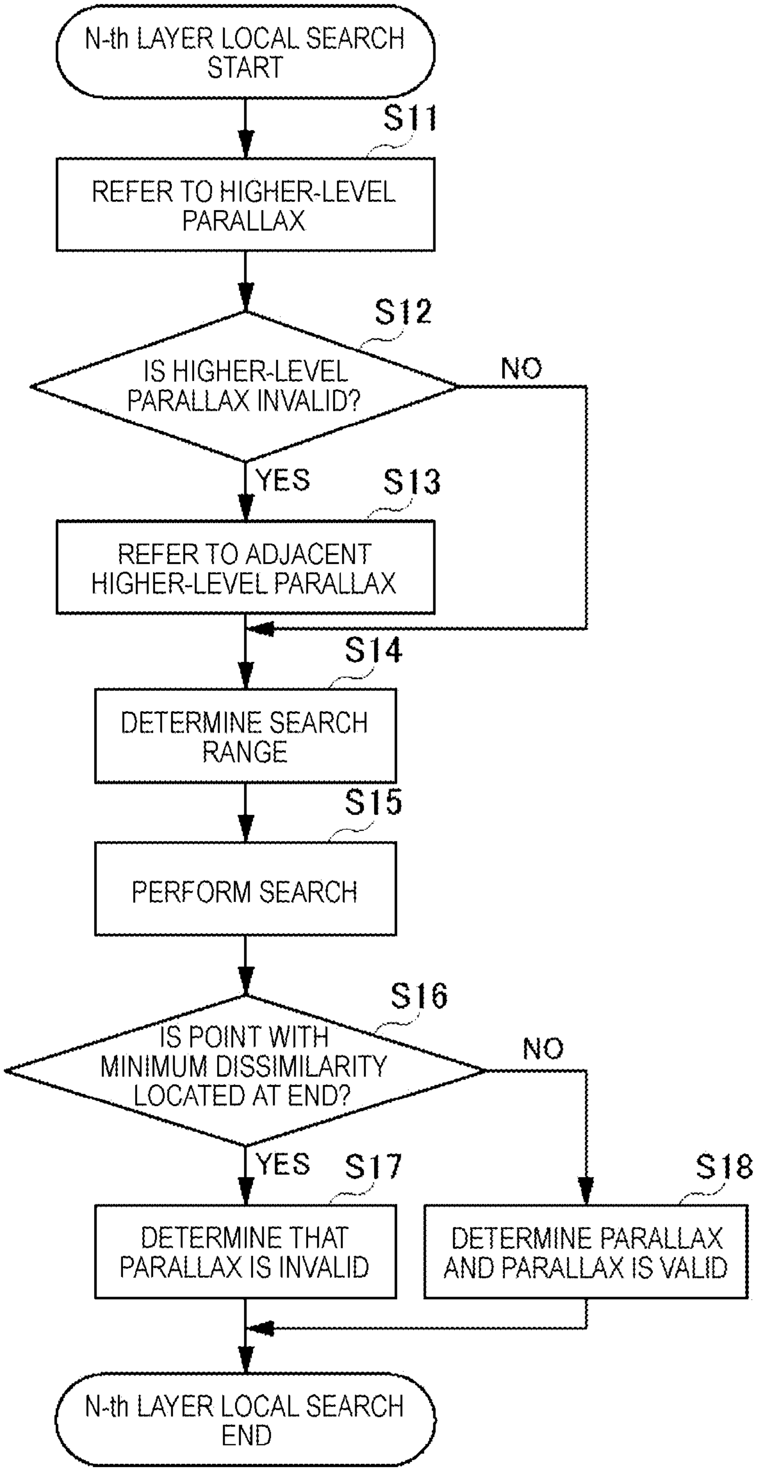

[FIG. 9]
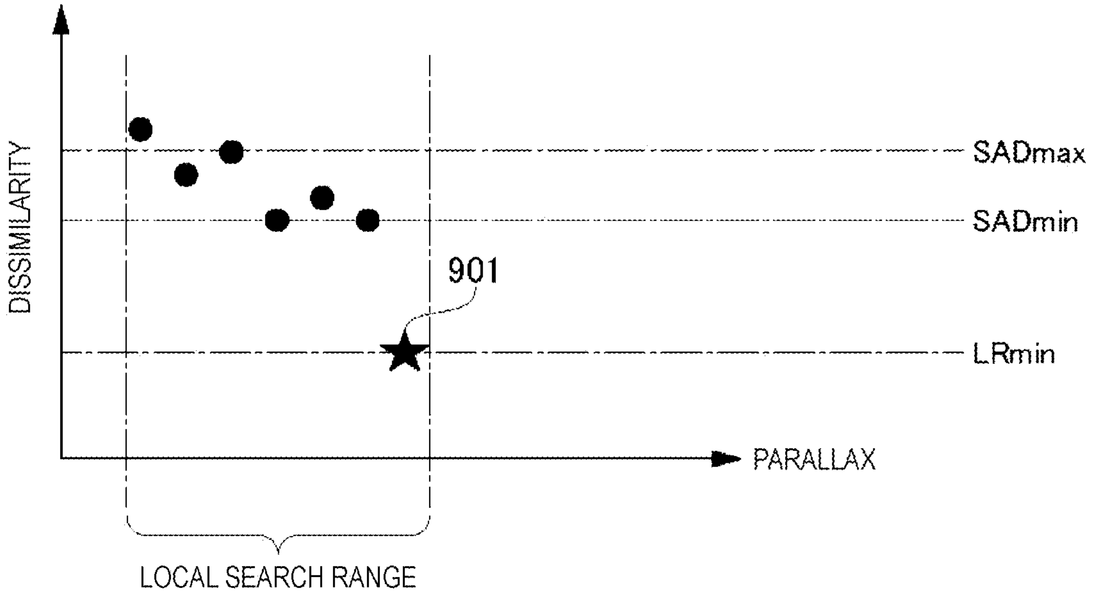

[FIG. 10]
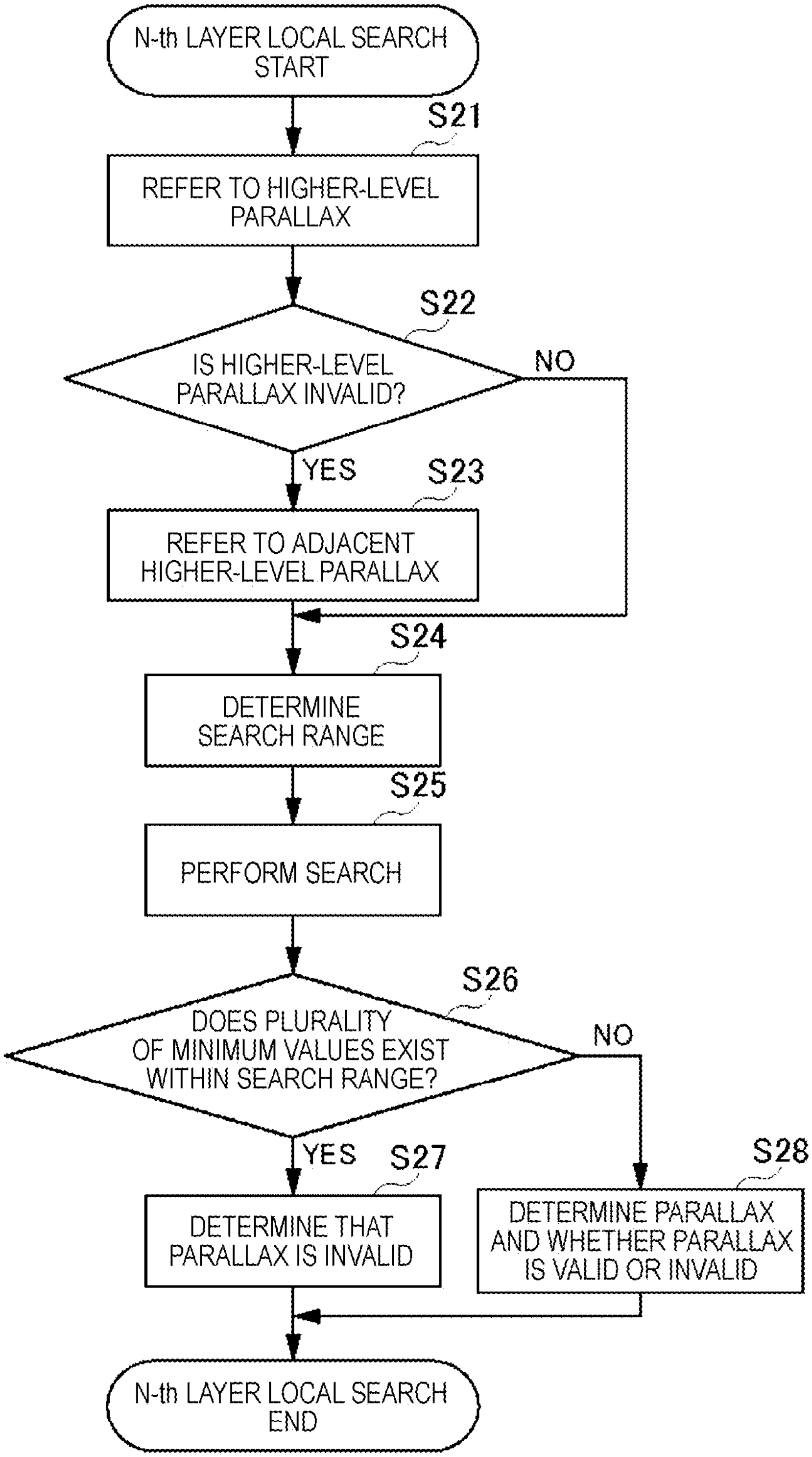

IMAGE PROCESSING DEVICE AND IMAGE PROCESSING METHOD

TECHNICAL FIELD

The present invention relates to an image processing device and an image processing method for monitoring an object to be targeted existing around a vehicle using images captured by a capturing device.

BACKGROUND ART

A position measurement device that measures a distance to an object existing in a camera's field of view based on stereo images captured by a stereo camera, which includes a pair of cameras, using the principle of triangulation to is known.

The principle of triangulation is to calculate the distance from the camera to the object using a positional shift between images (parallax) of the same object captured by the left and right cameras. Derivation of the parallax is achieved by specifying where an image of an object on one image is located on the other image.

Various methods have been proposed as methods for deriving parallax. For example, as a classical method, block matching, which is performed to search for an image region consisting of a plurality of pixels in one image, the image region having the lowest dissimilarity in the other image, is known.

In recent years, such distance measurement results have been used for automated driving (AD) and advanced driving assistance systems (ADAS) of vehicles. In automated driving, it is essential to detect an object that has fallen on the road at a greater distance and grasp a road surface condition such as a hole, a bump, and the like. However, since a distant object consists of fewer pixels in an image than a nearby object, more precise distance information is required. Therefore, there is a problem that the computation amount and computation time required for the derivation of the parallax are increased.

As a countermeasure against the increase in the computation amount and computation time, a hierarchical search in which a low-resolution parallax image is first created, and then only the surroundings of the corresponding low-resolution parallax, that is, the higher-level parallax, are searched for is known to a search for a higher-resolution parallax (see PTL 1).

CITATION LIST

Patent Literature

PTL 1: JP2001-319229A

SUMMARY OF INVENTION

Technical Problem

In PTL 1, in order to calculate a higher resolution (lower-level) parallax, the calculation amount and calculation time are reduced by searching only around the low resolution (higher-level) parallax calculated in advance. On the other hand, in searching for the parallax, for example, the calculated parallax reliability may be considered to be low and the parallax may be invalidated on the grounds that a dissimilarity between image regions in left and right images is minimized at an end of a parallax search range and that a true parallax is expected to exist outside the search range. In the hierarchical search, if a lower-resolution parallax is considered invalid, the higher-resolution parallaxes corresponding to this lower-resolution parallax cannot be searched and all of them become invalid. Consequently, there is a problem that a large amount of invalid parallax may occur in the final high-resolution parallax image.

In view of the above situation, there has been a demand for a method for increasing the possibility of parallax calculation by avoiding invalidating all the corresponding lower-level resolution parallaxes when the higher-level parallax is determined to be invalid in the hierarchical search.

Solution to Problem

In order to solve the above problem, an image processing device according to one aspect of the present invention is an image processing device including a parallax calculation unit that obtains a parallax by comparing two images captured by two cameras.

The parallax calculation unit performs a first layer stereo matching processing for obtaining a first parallax in units of an image region of a first size by specifying an image block having the first size image region and having the highest similarity to a first image block provided in one image of the two images from a first search range determined based on a first search width determined in advance in the other image of the two images, and a second layer stereo matching processing for obtaining a second parallax in units of an image region of a second size by specifying an image block having the second size image region smaller than the first size and having the highest similarity to a second image block provided in one image of the two images from a second search range determined based on the first parallax and a second search width determined in advance in the other image of the two images. Then, the parallax calculation unit expands the first search width or the second search range and performs a search when the image block having the highest similarity to the first image block exists at an end of the first search range in the first layer stereo matching processing.

Here, the search range is information on a start point and an end point of the search that determines the search width.

Advantageous Effects of Invention

According to at least one aspect of the present invention, when a higher-level parallax is determined to be invalid in a hierarchical search, the possibility of parallax calculation can be increased by avoiding invalidating all corresponding lower-level parallaxes.

Problems, configurations, and effects other than those described above will be clarified from the following description of the embodiments.

BRIEF DESCRIPTION OF DRAWINGS

FIG. 1 is a diagram showing an example of a hardware configuration of a control system in a vehicle.

FIG. 2 is a diagram showing a comparison of the surrounding situations of the vehicle, a coarse distance image, and a detailed distance image.

FIG. 3 is a block diagram showing an example of a functional configuration of a computing device according to a first embodiment of the present invention.

FIG. 4 is a diagram showing a concept of parallax determination by a parallax search unit provided in a parallax calculation unit in the first embodiment of the present invention.

FIG. 5 is a diagram showing an example of a local re-search determination and an example of an extension direction of a search range during re-search according to the first embodiment of the present invention.

FIG. 6 is a flowchart showing an example of a procedure of local search processing of an N-th layer of hierarchical search according to the first embodiment of the present invention.

FIG. 7 is a block diagram showing an example of a functional configuration of a parallax calculation unit in a computing device according to a second embodiment of the present invention.

FIG. 8 is a flowchart showing an example of a procedure for local search processing of an N-th layer of hierarchical search according to the second embodiment of the present invention.

FIG. 9 is a diagram showing an example of the magnitude of dissimilarity in a local search range in the second embodiment of the present invention.

FIG. 10 is a flowchart showing an example of a procedure for local search processing of an N-th layer of hierarchical search according to a third embodiment of the present invention.

DESCRIPTION OF EMBODIMENTS

Hereinafter, an example of a mode for embodying the present invention (hereinafter, referred to as an "embodiment") will be described with reference to the accompanying drawings. In this specification and the accompanying drawings, the same components or components having substantially the same functions will be given the same reference numerals and redundant descriptions thereof will be omitted. In addition, when a plurality of components having the same or similar functions exist, the components may be described by adding different subscripts to the same reference numeral. In addition, when it is not necessary to distinguish between the plurality of components, the description may be made without subscripts.

First Embodiment

First, a computing device (an example of an image processing device) according to a first embodiment of the present invention will be described with reference to FIGS. 1 to 6.

FIG. 1 is a diagram showing an example of a hardware configuration of a control system in a vehicle. A vehicle 10 shown in FIG. 1 includes a computing device 1, a left camera 2, a right camera 3, and a vehicle control device 4. The computing device 1 and the vehicle control device 4 are electronic control Units (ECUs). The left camera 2 and the right camera 3 output captured images obtained by capturing images of the surroundings of the vehicle 10 to the computing device 1. The left camera 2 and right camera 3 are located side by side in the horizontal direction. Hereafter, the image captured by the left camera 2 will be referred to as a first camera image 21, and the image captured by the right camera 3 will be referred to as a second camera image 31. In addition, the left camera 2 will also sometimes be referred to as a "first camera" and the right camera 3 as a "second camera."

Since the left camera 2 and the right camera 3 are located to face horizontally, both the first camera image 21 (left image) and the second camera image 31 (right image) are images obtained by capturing a three-dimensional space that spreads in the vertical direction and the horizontal direction. However, the horizontal and vertical referred to do not have a strict meaning, but rather mean to the extent that the left and right directions of the first camera image 21 and the second camera image 31 correspond to the horizontal direction rather than the top and bottom. For example, the left camera 2 and the right camera 3 may be inclined at a maximum of about 30 degrees with an optical axis as a rotation center.

The computing device 1 includes a CPU 11, which is a central processing unit, a ROM 12, which is a read-only storage device, a RAM 13, which is a readable and writable storage device, and an interface 14 that receives the first camera image 21 and the second camera image 31. A plurality of functions of the computing device 1, which will be described later, are realized by the CPU 11 loading a computer program stored in the ROM 12 into the RAM 13 and executing it. Instead of the ROM 12, the computer program may be stored in a non-volatile storage (not shown). The ROM 12 and the non-volatile storage are used examples of computer-readable non-transient recording media storing the program.

However, in the computing device 1, instead of the combination of the CPU 11, the ROM 12, and the RAM 13, some or all of the functions thereof may be realized by a field programmable gate array (FPGA), which is a rewritable logic circuit, or an application specific integrated circuit (ASIC), which is an integrated circuit for specific applications. In addition, instead of the combination of the CPU 11, the ROM 12, and the RAM 13, the computing device 1 may be realized by a combination of different configurations, for example, a combination of the CPU 11, the ROM 12, the RAM 13, and the FPGA.

The interface 14 receives the first camera image 21 (left image) and the second camera image 31 (right image) and provides them to the CPU 11. However, since only a small amount of information can be stored in registers provided in the CPU 11, the interface 14 stores the received first camera image 21 and the second camera image 31 in the RAM 13 so that the CPU 11 can freely refer to the information.

The computing device 1 uses the input first camera image 21 (left image) and the second camera image 31 (right image) to create a distance image 41 (see FIG. 2) containing distance information to an object around the vehicle 10 based on parallax, and outputs the distance image 41 to the vehicle control device 4. A process in which the computing device 1 creates the distance image 41 will be described in detail later with reference to FIG. 2 and subsequent figures. The distance image 41 is a representation of the perspective of distance on a two-dimensional plane using color shading and color saturation. However, in this embodiment, an integer value of "0" to "255" representing color shading is stored in each pixel of the distance image 41. Of these, "0" is a special value indicating that the distance could not be calculated.

A range shown in the distance image 41 is approximately the same as the first camera image 21 (left image) and the second camera image 31 (right image). However, the range shown in the distance image 41 may be narrower than that shown in the first camera image 21 and that shown in the second camera image 31. The number of pixels in the distance image 41 may be approximately the same as that of the first camera image 21 and that of the second camera image 31, or may be smaller than that of the first camera image 21 and that of the second camera image 31.

That is, the three-dimensional space recorded in the first camera image 21 (left image) and the second camera image 31 (right image) may at least partially overlap. The mounting positions and mounting postures of the left camera 2 and the right camera 3 on the vehicle 10 are known, and a relative positional relationship between the first camera image 21 and the second camera image 31 is also known. Therefore, it is also known which position in the three-dimensional space of a given pixel in the first camera image 21 corresponds to which position in the second camera image 31. The relative positional relationship between the first camera image 21 and the second camera image 31 may be obtained by computation, or may be obtained by referring to a lookup table or the like prepared in advance.

That is, since the relative positions of the left camera 2 and the right camera 3 are known and internal parameters of the two cameras are also known, the relationship between a distance to the camera and parallax of a subject is also known. In this embodiment, the relationship between the distance and the parallax is stored in the ROM 12 of the computing device 1 as a parallax table (not shown). In this embodiment, since the relationship between the distance and the parallax is known, the parallax can also be referred to as "information corresponding to distance." In addition, in this embodiment, since the distance and the parallax can be easily converted into each other, both can be considered to be substantially the same information.

The vehicle control device 4 controls the vehicle 10 using the distance image 41 input from the computing device 1. The vehicle control device 4 detects, for example, an obstacle existing around the vehicle 10 from the distance image 41, and controls the vehicle 10 so as to avoid a collision between the vehicle 10 and the detected obstacle. The control of the vehicle 10 by the vehicle control device 4 is realized, for example, by the vehicle control device 4 outputting an operation command to a steering device (not shown) and a braking device (not shown).

[Surrounding Situations of Vehicle, Coarse Distance Image, and Detailed Distance Image]

FIG. 2 is a diagram showing a comparison of the surrounding situations of a subject, the coarse distance image, and the detailed distance image.

FIG. 2 is a diagram for describing a comparison of the resolution of information stored in the first camera image 21, the second camera image 31, a coarse distance image 45, and a detailed distance image 46. However, the resolution here does not refer to the distance in the depth direction, but rather to a resolution level in the vertical direction and the horizontal direction on the image. The coarse distance image 45 and the detailed distance image 46 are examples of the distance image 41 shown in FIG. 1.

The upper part of FIG. 2 shows the surrounding situations of the vehicle 10, in which another vehicle 20 exists. The middle part of FIG. 2 is a conceptual diagram showing the resolution of the coarse distance image 45 obtained by capturing the vehicle 20, and the lower part of FIG. 2 is a conceptual diagram showing the resolution of the detailed distance image 46, which has a higher resolution than the coarse distance image 45.

In the coarse distance image 45 shown in the middle part of FIG. 2, distance information for each of a total of 25 image regions, which are obtained by dividing the region shown in the upper part of FIG. 2 vertically and horizontally into five sub-regions, is stored.

In the detailed distance image 46 shown in the lower part of FIG. 2, distance information for each of a total of 100 image regions, which are obtained by dividing the region shown in the upper part of FIG. 2 vertically and horizontally by ten sub-regions, is stored. In the coarse distance image 45 and the detailed distance image 46, the top and bottom of the illustrated images correspond to the vertical direction, and the left and right of the illustrated images correspond to the horizontal direction.

In this embodiment, an image region indicated by one piece of distance information contained in the coarse distance image 45 as shown in the middle part of FIG. 2 is referred to as a "first image block," and an image region indicated by one piece of distance information contained in the detailed distance image 46 as shown in the lower part of FIG. 2 is referred to as a "second image block." The size of the first image block (first size) is greater than the size of the second image block (second size). In the example shown in FIG. 2 and this embodiment, a width and height of the first image block are twice as large as those of the second image block, and an area of the first image block is four times larger that of the second image block. However, as long as the first image block is greater than the second image block, there is no particular restriction on the multiple.

Although distance information for one point is not necessarily distance information obtained by measuring the entire first image block, in this embodiment, the distance information is conveniently considered to be distance information representing the entire first image block. It is also known that each of the second image blocks in the detailed distance image 46 may be contained in a region of any of the first image blocks in the coarse distance image 45.

Each of the first camera image 21 and the second camera image 31 has brightness and saturation information at a resolution equal to or higher than that of the second image block. In accordance with the example of FIG. 2, each of the first camera image 21 and the second camera image 31 has information of at least ten pixels vertically and horizontally, that is, one hundred pixels or more in total, in the range shown in the upper part of FIG. 2. The first camera image 21 and the second camera image 31 may have approximately the same number of pixels as that of the detailed distance image 46, or may have twice or ten times as many pixels in the vertical direction and the horizontal direction. In this embodiment, as an example, the first camera image 21 and the second camera image 31 have approximately the same number of pixels as that of the detailed distance image 46.

[Functional Configuration of Parallax Calculation Unit]

Next, an example of a functional configuration of the computing device 1 according to the first embodiment of the present invention will be described with reference to FIG. 3.

FIG. 3 is a block diagram showing an example of the functional configuration of the computing device 1. As shown in FIG. 3, the computing device 1 includes a parallax calculation unit 100 configured with a parallax search unit 101, a higher-level reference parallax determination unit 102, and a parallax invalidity determination unit 103. The functions of the parallax search unit 101, the higher-level reference parallax determination unit 102, and the parallax invalidity determination unit 103 of the parallax calculation unit 100 are realized by software processing by the CPU 11 described above. Information generated by the processing described below, for example, search range information, parallax information, dissimilarity information, higher-level parallax information, parallax invalidity information, and search range change instruction, is temporarily stored in the RAM 13.

In addition, as described above, the distance from the left and right cameras to the subject in question can be obtained based on the parallax between the two left and right camera images containing the same subject using the principle of triangulation. Therefore, distance images (for example, the coarse distance image 45, the detailed distance image 46, and the like) may be generated in the parallax calculation unit 100 based on the parallax information of the two images and output to the vehicle control device 4. However, in this embodiment, an example will be described in which the parallax calculation unit 100 calculates parallax information and outputs it to the vehicle control device 4.

The parallax calculation unit 100 receives the first camera image 21 (left image) and the second camera image 31 (right image) captured at different viewpoints by the left camera 21 and the right camera 31.

The parallax search unit 101 performs parallax search (parallax determination) by comparing the two images of the first camera image 21 and the second camera image 31 and outputs "parallax information" as the search result and "dissimilarity information" used for parallax determination. As an example of this search processing, stereo matching processing can be used. In the stereo matching processing, image blocks to be compared in two images are shifted by one pixel each and collated. The stereo matching processing here is an example of first layer stereo matching processing. If the parallax to be generated at this time is not the highest level parallax in the hierarchical search (see, for example, PTL 1), the parallax search unit 101 obtains "search range information" from the higher-level reference parallax determination unit 102 and performs a local search in which a search is performed only in that range. This local search processing is an example of second layer stereo matching processing. In the following description, the parallax search is also simply referred to as "search."

The search range information described above is information on pixels of a start point and an end point that determine a search range (pixel shift amount) in another camera image (for example, second camera image 31) relative to a reference camera image (for example, first camera image 21) in the parallax search using the stereo matching processing. A search width is obtained from the start and end points. In general, the higher the resolution of the image, the wider the search width.

In addition, the highest level parallax is a parallax searched from the lowest resolution image among a plurality of hierarchical resolution images when the plurality of hierarchical resolution images are generated from the camera image (original image). As a result of the search, the parallax search unit 101 determines the parallax so that the dissimilarity is minimized. Information on the determined parallax (information indicating a position of the parallax on the image) is sent to the parallax invalidity determination unit 103 together with dissimilarity information.

The parallax invalidity determination unit 103 refers to the "dissimilarity information" output from the parallax search unit 101 and determines whether or not the parallax determined by the parallax search unit 101 is located at an end of a local search range. If the position of the determined parallax is at the end, the parallax invalidity determination unit 103 assumes that there is a high possibility that a point with a lower dissimilarity, that is, a true parallax, exists outside the local search range, and issues an instruction to change (for example, extend) the local search range to outside the end of the local search range where the determined parallax is located and to re-search ("search range change instruction" in the figure) to the parallax search unit 101.

As for the extent of extension of the local search range, the search range after extension and the extension width are determined in advance for each condition such as a layer (resolution) of the image, and are registered in the parallax calculation unit 100 (for example, ROM 12). The extent of extension of the local search range differs for each layer of the image depending on, for example, the allowable search time and cost. For example, the search time differs depending on a processing capability of the computing device 1 and a data size of the camera image. The maximum extension width of the local search range is determined by a circuit scale (processing capability) of the computing device 1.

The parallax search unit 101 performs a re-search upon receiving the search range change instruction from the parallax invalidity determination unit 103, and outputs, as the parallax, a point at which the dissimilarity is smallest including the extended search range again.

In this case, an upper limit may be set for the extended search range by taking the computation amount and computation time of the computing device 1 into consideration. That is, in the computing device 1, when the search is performed by expanding the first search range (search width of higher layer) or the second search range (search range of lower layer), an upper limit is set in advance to the first search range or the second search range. According to the present embodiment configured in this way, by setting the upper limit to the first search width or the second search range, it is possible to reduce the computation amount and shorten the computation time of the computing device 1.

Furthermore, when the parallax search unit 101 finds a first minimum value of dissimilarity in a process of re-searching, the parallax search unit 101 may terminate the search at that time point and output a point of the first minimum value as the parallax. That is, the parallax search unit 101 can be configured to terminate the search based on the point at which the similarity decreases along a search direction when the search is performed by expanding the first search width (search width of higher layer) or second search range (search range of lower layer). According to the present embodiment configured in this way, it is possible to reduce the calculation amount and shorten the calculation time of the computing device 1 by determining the parallax based on the point at which the similarity decreases along the search direction.

In this specification, the terms smallest and minimum are used, but in this specification, they include not only smallest and minimum in a strict mathematical sense but also substantial smallest and minimum. For example, a minimum point corresponds to a point where a differential value is 0 or a predetermined value or less (for example, a small value close to 0).

Furthermore, whether or not an extension search is conducted and the extent of the extension may be changed depending on whether the extension direction of the local search range described later with reference to FIG. 5 is the same as or opposite to a search direction. That is, the parallax search unit 101 can be configured to determine the first search width or the second search range based on which end of the first search range the image block with the highest similarity has been found when an image block with the highest similarity to the first image block exists at the end of the first search range, in the first layer stereo matching processing (local search of higher layer). According to this embodiment configured in this way, it is possible to search for a parallax with higher similarity by determining the first search width or the second search range based on which end of the first search range the image block with high similarity (smallest dissimilarity) is found.

The "parallax information" of the re-search result and the "dissimilarity information" are sent from the parallax search unit 101 to the parallax invalidity determination unit 103 again. Here, the parallax invalidity determination unit 103 may send the result of the re-search once in the parallax search unit 101 as "parallax information" and "parallax invalidity (valid/invalid) information" to the vehicle control device 4 as it is, or a determination for re-search may be performed again in the parallax invalidity determination unit 103. A basic concept of valid/invalid is that if the position of the determined parallax is not the end of the local search range, the parallax is determined to be valid, and if the position of the determined parallax is the end of the local search range, the parallax is determined to be invalid.

[Parallax Determination by Parallax Search Unit]

Next, the concept of parallax determination by the parallax search unit 101 (FIG. 3) provided in the parallax calculation unit 100 in the first embodiment of the present invention will be described with reference to FIG. 4.

FIG. 4 is a diagram showing a concept of parallax determination by the parallax search unit 101 of the parallax calculation unit 100. In the upper part of FIG. 4, the first camera image 21 and the second camera image 31 are shown. In this example, a reference image corresponding to an image region 201 of the first camera image 21, which is a standard image, that is, an image region of the second camera image 31, is searched for. Although the first camera image 21 is used as the standard image, the second camera image 31 may also be used as the standard image.

In this embodiment, since the left camera 2 and the right camera 3 are installed side by side in the horizontal direction, an epipolar line 202 according to epipolar geometry is shown as a dashed line extending in the horizontal direction. When the width of each of the first camera image 21 and the second camera image 31 in the illustrated horizontal direction is one thousand pixels, and the center of the image region 201 is the 400-th pixel from a left end of the first camera image 21, a numerical value of −400 to +600 is assigned to the horizontal direction of the second camera image 31, which is the reference image, as illustrated. For example, when the parallax search unit 101 determines that an image region 203 centered a 500 pixel from the left end of the reference image corresponds to the image region 201 of the standard image, the parallax is calculated as "100".

The middle part of FIG. 4 is a diagram showing an example of the dissimilarity with respect to the image region 201 for each position on the epipolar line 202 of the reference image (second camera image 31). In the example shown in the middle part of FIG. 4, since there is a peak (minimum point) where the dissimilarity is smallest, and there are no other peaks with values close to it, the parallax search unit 101 calculates the parallax of the image region 201 as "100".

The lower part of FIG. 4 shows another example of the dissimilarity with respect to the image region 201 for each position on the epipolar line 202 of the reference image (second camera image 31). In the example shown in the lower part of FIG. 4, since there are two peaks where the dissimilarity is smallest, and their dissimilarity values are approximately the same, it is not possible to determine whether the parallax of the image region 201 is "−180" or "+115". In such a case, the parallax search unit 101 treats the image region 201 as an invalid region and sets a parallax of "0" for the position of the distance image 41 that corresponds to the image region 201. A related invention in which there are a plurality of peaks at which the dissimilarity is smallest is shown in a third embodiment described later.

[Example of Local Re-Search Determination and Search Range Extension Direction During Re-Search]

FIG. 5 is a diagram showing an example of local re-search determination and an example of search range extension direction during re-search according to the first embodiment of the present invention. The horizontal axis of the graph in the figure indicates the position (corresponding to the pixel shift amount) when comparing the first camera image 21 and the second camera image 31, and the vertical axis indicates the dissimilarity of the comparison result. The region between two dashed lines indicates the local search range.

In the graph in the upper part of FIG. 5, the dissimilarity of parallax in the local search range monotonically decreases, and the dissimilarity is smallest at the right end of the local search range. Therefore, the parallax search unit 101 outputs a parallax 501 at the right end of the local search range, but at the same time, it also outputs five dissimilarities calculated here (including the dissimilarity corresponding to the parallax 501). The parallax invalidity determination unit 103 can determine that the parallax 501 is located at the right end of the local search range, that is, that the parallax 501 is invalid by acquiring five dissimilarity together with the parallax 501 from the parallax search unit 101. Therefore, the parallax 501 becomes a target of the search range change instruction issued by the parallax invalidity determination unit 103.

Alternatively, the parallax search unit 101 may output, instead of the dissimilarity, information indicating that the output parallax is at the end or the right end of the local search range. The parallax invalidity determination unit 103 can determine from these pieces of information that the parallax output by the parallax search unit 101 is at the end (here, the right end) of the local search range. In the example shown in the upper part of FIG. 5, the extension direction of the search range during re-search is the right direction (the direction in which the pixel shift amount increases).

In the graph in the middle part of FIG. 5, although the dissimilarity of parallax in the local search range does not decrease monotonically but has a maximum value, the parallax search unit 101 still outputs a parallax 502 located at the right end of the local search range as the smallest point of dissimilarity. Therefore, the parallax 502 is a target of the search range change instruction issued by the parallax invalidity determination unit 103. The extension direction of the search range during re-search is the right direction (the direction in which the pixel shift amount increases).

In the graph of the lower part of FIG. 5, although the dissimilarity of parallax in the local search range does not increase monotonically but has a maximum value and a minimum value, the dissimilarity of a parallax 503 located at the left end of the local search range is the smallest value. Therefore, the parallax 503 is a target of the search range change instruction issued by the parallax invalidity determination unit 103. The extension direction of the search range during re-search is the left direction (the direction in which the pixel shift amount decreases).

[Example of Local Search Processing Procedure]

Next, an example of a procedure of local search processing of an N-th layer of hierarchical search in the first embodiment of the present invention will be described with reference to FIG. 6.

FIG. 6 is a flowchart showing an example of the procedure of local search processing of the N-th layer of hierarchical search by the parallax calculation unit 100 in the first embodiment.

First, in the parallax calculation unit 100, the higher-level reference parallax determination unit 102 refers to a parallax of an (N−1)-th layer (lower resolution) higher than the N-th layer obtained from the parallax invalidity determination unit 103 (step S1), and determines an initial search range in the N-th layer (step S2). If the N-th layer is the highest layer (lowest resolution), the search range is set in advance and stored in the ROM 12.

Next, the parallax search unit 101 sets the initial search range determined by the higher-level reference parallax determination unit 102 as a search range for a local search, and performs the local search for that search range (step S3).

Next, the parallax invalidity determination unit 103 determines whether the point where the dissimilarity is smallest is located at an end of the search range based on the search result by the parallax search unit 101 (step S4).

When the point where the dissimilarity is smallest in step S4 is not at the end of the search range (NO in step S4), the parallax invalidity determination unit 103 determines and outputs the parallax and determination of whether the parallax is valid/invalid (valid in this case) (step S7). The information on the parallax and whether the parallax is valid/invalid is output to the vehicle control device 4 and the higher-level reference parallax determination unit 102.

On the other hand, when the point where the dissimilarity smallest is at the end of the search range (YES in step S4), the parallax invalidity determination unit 103 determines whether the number of re-searches is within a preset upper limit of the number of re-searches (step S5). When the number of re-searches is within the preset upper limit of the number of re-searches (YES in step S5), the parallax invalidity determination unit 103 issues a search range change instruction to the parallax search unit 101. The determination processing in step S5 is provided in consideration of the allowable processing time, but may be deleted.

Next, if the parallax search unit 101 receives the instruction to change the search range, the parallax search unit 101 modifies the search range during the local search in step S3 (step S6) and re-searches for parallax (step S3).

Next, after the YES determination in step S4, when the parallax invalidity determination unit 103 determines that the number of re-searches has reached a preset upper limit thereof (NO in step S5), the parallax invalidity determination unit 103 decides and outputs the parallax and determination of whether parallax is valid/invalid (step S7). After the processing in step S7, the local search processing of the N-th layer of hierarchical search is terminated.

As described above, the image processing device (computing device 1) according to the first embodiment is an image processing device including a parallax calculation unit (parallax calculation unit 100) that compares two images (first camera image 21 and second camera image 31) captured by two cameras (left camera 2 and right camera 3) to obtain the parallax.

The parallax calculation unit performs a first layer stereo matching processing (local search of higher layer) that obtains a first parallax in units of an image region of a first size by specifying an image block (for example, image region 203) having a first size image region and having the highest similarity to a first image block (for example, image region 201) provided in one image of the two images from a first search range (local search range) determined based on a first search width determined in advance in the other image of the two images, and a second layer stereo matching processing (local search (re-search) of lower layer) that obtains a second parallax in units of an image region of a second size by specifying an image block having a second size image region smaller than the first size and having the highest similarity to a second image block provided in one image of the two images from a second search range determined based on the first parallax and a second search width determined in advance in the other image of the two images. Then, in the first layer stereo matching processing, when an image block having the highest similarity to the first image block exists at the end of the first search range, the parallax calculation unit expands the first search width or the second search range and performs a search (for example, based on the changed (extended) local search range).

According to the present embodiment having the above configuration, when a higher-level parallax is determined to be invalid in the hierarchical search, the possibility of parallax calculation can be increased by avoiding invalidating all of the corresponding lower-level parallaxes. Further, since highly accurate distance information can be calculated without increasing the computation amount and computation time required for deriving the parallax, even a distant object can be grasped with high accuracy. Accordingly, according to this embodiment, it is possible to detect an object that has fallen on the road from a greater distance and to grasp a road surface condition such as a hole, a bump, and the like, and this embodiment is suitable for application to autonomous driving (AD) and advanced driving assistance systems (ADAS).

In addition, in this embodiment, a configuration in which, even if the parallax is determined to be invalid, the local search range (or search width) is changed and a re-search is performed, is adopted. Therefore, in this embodiment, not only is the true smallest value (minimum value) of dissimilarity (similarity) obtained from two images, but it is fed back to the same or lower layer in the hierarchical search, so that even if it is determined to be invalid once, a valid parallax can be efficiently searched without increasing the computational load.

Second Embodiment

A second embodiment is an example configured to output an invalid determination in the relevant layer when the dissimilarity of parallax becomes the smallest value at the end of the local search range. Hereafter, the second embodiment will be described by focusing mainly on the difference from the first embodiment.

[Functional Configuration of Parallax Calculation Unit]

FIG. 7 is a block diagram showing an example of a functional configuration of a parallax calculation unit in a computing device (an example of an image processing device) according to the second embodiment of the present invention. As shown in FIG. 7, the computing device 1 includes a parallax calculation unit 100A configured with the parallax search unit 101, the higher-level reference parallax determination unit 102, and the parallax invalidity determination unit 103. However, the parallax calculation unit 100A of the computing device 1 according to this embodiment is different from the parallax calculation unit 100 according to the first embodiment (FIG. 3) in that there is no signal line for issuing a search range change instruction from the higher-level reference parallax determination unit 102 to the parallax search unit 101.

As in the first embodiment, the first camera image 21 (left image) and the second camera image 31 (right image)

captured from different viewpoints by the left camera 21 and the right camera 31 are input to the parallax search unit 101.

As in the first embodiment, the parallax search unit 101 performs parallax search (parallax determination) by comparing the two images of the first camera image 21 and the second camera image 31, and outputs "parallax information" as the search result and "dissimilarity information" used for parallax determination. The search processing here is an example of the first layer stereo matching processing. When the parallax generated at this time is not the highest parallax in the hierarchical search (see, for example, PTL 1), the parallax search unit 101 obtains "search range information" from the higher-level reference parallax determination unit 102 and performs a local search that searches only in that range. This local search processing is an example of the second layer stereo matching processing.

As a result of the search, the parallax search unit 101 determines the parallax so that the dissimilarity is minimized. Information on the determined parallax (information representing the position of the parallax on the image) is sent to the parallax invalidity determination unit 103 together with the dissimilarity information.

The parallax invalidity determination unit 103 determines whether or not the parallax determined by the parallax search unit 101 is located at the end of the local search range by referring to the "dissimilarity information" output from the parallax search unit 101. If the determined position of the parallax is at the end, the parallax invalidity determination unit 103 assumes that there is a high possibility that a point with a lower dissimilarity, that is, a true parallax, exists outside the local search range, and determines that the parallax is invalid. The parallax invalidity determination unit 103 outputs the "parallax information" and the "parallax invalidity (valid/invalid) information" output from the parallax search unit 101 to the vehicle control device 4 and the higher-level reference parallax determination unit 102. The parallax determined as invalid here is referred to as a higher-level parallax during local search of a lower layer, but if the parallax remains invalid, all lower-level parallaxes are determined as invalid. In that case, for example, by using the method described in JP2020-140344A and performing a local search around the search range of the adjacent higher-level parallax, it may be possible to avoid determination that the parallax is invalid and output the lower-level parallax.

[Example of Local Search Processing Procedure]

Next, an example of the procedure of the local search process of the N-th layer of hierarchical search in the second embodiment of the present invention will be described with reference to FIG. 8.

FIG. 8 is a flowchart showing an example of the procedure of the local search processing of the N-th layer of hierarchical search by the parallax calculation unit 100A in the second embodiment.

First, in the parallax calculation unit 100, the higher-level reference parallax determination unit 102 refers to the parallax of the (N−1)-th layer (lower resolution) higher than the N-th layer obtained from the parallax invalidity determination unit 103 (step S11). The higher-level reference parallax determination unit 102 then determines the initial search range in the N-th layer.

Next, the higher-level reference parallax determination unit 102 determines whether or not the higher-level parallax is invalid (step S12), and when the higher-level parallax is not invalid (NO in step S12), the process proceeds to step S14.

When it is determined in step S12 that the higher-level parallax is invalid (YES in step S12), the higher-level reference parallax determination unit 102 switches a reference destination to a parallax in a higher layer adjacent to the higher-level parallax (step S13).

When the determination result in step S12 is NO, or after the processing of step S13, the parallax search unit 101 sets a search range for the local search. When the determination result in step S12 is NO, the parallax search unit 101 sets the initial search range determined by the higher-level reference parallax determination unit 102 as the search range for the local search (step S14). In addition, after the processing of step S13, the parallax search unit 101 sets the search range for the local search around the adjacent parallax of the higher layer referred to by the higher-level reference parallax determination unit 102 (step S14).

Next, the parallax search unit 101 performs the local search in the search range for the set local search (step S15).

Next, the parallax invalidity determination unit 103 determines whether or not the point where the dissimilarity is smallest is located at the end of the search range based on the search result by the parallax search unit 101 (step S16).

When the point where the dissimilarity is smallest is not at the end of the search range in step S16 (NO in step S16), the parallax invalidity determination unit 103 determines and outputs the parallax and the determination that parallax is valid (step S18).

On the other hand, when the point where the dissimilarity is smallest is at the end of the search range (YES in step S16), the parallax invalidity determination unit 103 determines that the parallax is invalid and outputs the determination result (step S17). Information on the parallax and determination of whether parallax is valid/invalid are output to the vehicle control device 4 and the higher-level reference parallax determination unit 102. After the processing of step S17 or S18, the local search processing of the N-th layer of hierarchical search is terminated.

In this embodiment, the processing of determining whether the number of re-searches in step S5 of FIG. 3 described in the first embodiment is within the upper limit may be provided after the processing of step S16.

The invalidity determination described in this embodiment does not need to be uniform for all local searches. For example, in this embodiment, operation such as turning off a function of changing the local search range (hereinafter, "this function") when the parallax invalidity determination is made in the present invention in a relatively higher layer (for example, the lower resolution layer of highest level of the three layers) where a wider range than an any threshold is searched in one parallax search due to low resolution, and conversely, turning on the function in a relatively lower layer where a narrower range is searched in one parallax search due to high resolution, can be performed.

In this way, in the computing device 1 (image processing device), the parallax search unit 101 can be configured to determine whether or not to expand the first search width (search width of higher layer) or the second search range (search range of lower layer) and perform a search, based on the size of the first image block (image block of camera image of higher layer). According to this embodiment having such a configuration, the parallax search can be efficiently performed according to the size of the first image block provided in one image of the two images.

In addition, it is possible to operate this function by turning it on by considering that the probability that the smallest value exists outside the local search range is high when the difference in dissimilarity in the local search is greater than an any threshold, and conversely, to operate this function by turning it off by considering that the probability that the smallest value exists outside the local search range is low when the difference in dissimilarity is small.

In this way, in the computing device 1 (image processing device), the parallax search unit 101 can be configured to determine whether or not to expand the first search width or the second search range and perform a search based on whether or not the difference in similarity in the first search range is greater than a predetermined threshold, in the search (local search of higher layer) in the stereo matching processing of the first layer. According to this embodiment having such a configuration, parallax search can be efficiently performed according to the difference in similarity in the first search range.

In addition, it is also possible to operate this function by turning it on when the dissimilarity of the parallax near the end with the smallest value in the local search range is different from the dissimilarity of other parallaxes by a predetermined amount or more.

In this way, in the computing device 1 (image processing device), the parallax invalidity determination unit 103 can be configured to determine whether or not to expand the first search width or the second search range and perform a search based on whether or not the similarity of the image block with the highest similarity is different from the similarities of other image blocks in the search range by a value greater than a predetermined threshold, in the search in the first layer stereo matching processing (local search of higher layer). According to this embodiment having such a configuration, parallax search can be efficiently performed according to the difference in similarity in the first search range.

[Example of Local Search Processing Procedure]

Below, the on/off switching of this function described above will be described with reference to FIG. 9.

FIG. 9 is a diagram showing an example of the magnitude of dissimilarity in the local search range in the second embodiment of the present invention.

For example, as shown in FIG. 9, it is assumed that the smaller of the dissimilarities at the left and right ends of the local search range is "LRmin", the maximum dissimilarity excluding the left and right ends is "SADmax", and the smallest is "SADmin". Here, a threshold Th0 may be determined, and the parallax invalidity determination unit 103 may operate to determine whether or not the following (1) is satisfied, and turn on this function when equation (1) is satisfied.

[Equation 1]

$$SAD\text{min} - LR\text{min} \geq Th0 \tag{1}$$

The reason for this operation is that since the dissimilarity drops significantly at the left and right ends of the local search range, there is a high possibility that points with smaller dissimilarity exist outside the local search range.

In addition, a threshold value Th1 may be set, and the parallax invalidity determination section 103 may operate to determine whether or not the following equation (2) is satisfied, and turn on this function when equation (2) is satisfied.

[Equation 2]

$$SAD\text{max} - LR\text{min} \geq Th1 \tag{2}$$

The reason for this operation is that it is possible to infer that points with smaller dissimilarity exist around the local search range due to the large fluctuation in dissimilarity in the local search range.

Similarly, a threshold value Th2 may be set, and the parallax invalidity determination unit 103 may operate to determine whether or not the following equation (3) is satisfied, and turn on this function when equation (3) is satisfied.

[Equation 3]

$$SAD\text{max} - SAD\text{min} \geq Th2 \tag{3}$$

In this way, in the computing device 1, the parallax invalidity determination unit 103 can be configured to determine whether or not to expand the first search width (search width of the higher layer) or the second search range (search range of the lower layer) and perform a search based on whether or not a luminance gradient in the image block (gradient of dissimilarity, for example, SADmin−LRmin, SADmax−LRmin, or SADmax−SADmin) is greater than a predetermined threshold (for example, Th0, Th1, or Th2). According to this embodiment having such a configuration, parallax search can be performed efficiently according to the luminance gradient in the image block.

In the computing device 1, the parallax invalidity determination unit 103 may be configured to determine whether or not to expand the first search width or the second search range and perform a search based on whether or not the first parallax obtained in the first layer stereo matching processing (local search of higher layer) is greater than a predetermined threshold. According to this embodiment having such a configuration, parallax search can be efficiently performed according to the distance from the two cameras to the object (relationship between the first parallax and the threshold).

Third Embodiment

Next, a computing device (one example of an image processing device) according to a third embodiment will be described with reference to FIG. 10.

FIG. 10 is a flowchart showing an example of a procedure of local search processing of an N-th layer of hierarchical search by the parallax calculation unit 100A according to the third embodiment. For the parallax calculation unit 100A according to this embodiment, the same configuration as the parallax calculation unit 100A according to the second embodiment can be used. The processing of steps S21 to S25 in FIG. 10 is the same as the processing of steps S11 to S15 in FIG. 8 in the second embodiment, and thus the description thereof will be omitted.

First, in the parallax calculation unit 100A, the higher-level reference parallax determination unit 102 and the parallax search unit 101 perform the processing of steps S21 to S25.

After the processing of step S25, the parallax invalidity determination unit 103 determines whether or not a plurality of minimum values of dissimilarity exist in the local search range based on the search result by the parallax search unit 101 (step S26).

When one minimum value of dissimilarity exists in the local search range in step S26 (NO in step S26), the parallax invalidity determination unit 103 determines whether the parallax is valid or invalid depending on the position of the minimum value in the local search range (whether or not the distance to the end is closer than the threshold value), and determines and outputs the parallax and the determination of whether parallax is valid/invalid (step S28).

On the other hand, a plurality of minimum values of dissimilarity exist in the local search range (YES in step S26), the parallax invalidity determination unit 103 determines that the parallax is invalid and outputs the determination result (step S27). Information on the parallax and valid/invalid parallax is output to the vehicle control device 4 and the higher-level reference parallax determination unit 102. After the processing of step S27 or S28, the local search processing of the N-th layer of hierarchical search is terminated.

As described above, the image processing device (computing device 1) according to the third embodiment can be configured to perform the second layer stereo matching processing (local search of lower layer) without outputting the first parallax as a result of the first layer stereo matching processing when a plurality of image blocks that are considered to be similar to the first image block exist, in the first layer stereo matching processing (local search of higher layer).

According to this embodiment having the above configuration, when a plurality of image blocks that are considered to be similar to the first image block exist in the first layer stereo matching processing, the obtained parallax is determined to be invalid and the second layer stereo matching processing (local search in lower layer) is performed, so that it is possible increase the possibility of parallax calculation by avoiding invalidating all of the corresponding lower parallaxes.

In addition, in the computing device 1, the parallax invalidity determination unit 103 can be configured to use the configuration of the second embodiment to determine whether or not to output the first parallax based on whether or not the luminance gradient in the image block is greater than a predetermined threshold. According to this embodiment having such a configuration, parallax search can be efficiently performed according to the luminance gradient in the image block.

Modifications

Furthermore, the present invention is not limited to the above-mentioned embodiments, and various other applications and modifications are possible as long as they do not deviate from the gist of the present invention described in the claim. For example, the embodiments described above are detailed and specific descriptions of the configuration thereof in order to describe the present invention in an easy-to-understand manner, and are not necessarily limited to those having all the components described. It is also possible to replace a part of the configuration of one embodiment with a component of another embodiment. In addition, it is also possible to add a component of another embodiment to the configuration of one embodiment. It is also possible to add, replace, or delete other components for a part of the configuration of each embodiment.

In addition, in this specification, the processing steps that describe chronological processing include not only processing that is performed chronologically in the described order, but also processing that is executed in parallel or individually (for example, processing by objects), even if they are not necessarily processed chronologically.

In addition, in the embodiments described above, control lines and information lines are shown that are considered necessary for description, and not all control lines and information lines are necessarily shown on the product. In fact, almost all components may be considered interconnected.

REFERENCE SIGNS LIST

- 1: computing device
- 2: left camera
- 3: right camera
- 4: vehicle control device
- 10: vehicle
- 20: subject
- 41: distance image
- 45: coarse distance image
- 46: detailed distance image
- 21: first camera image (left camera image)
- 31: second camera image (right camera image)
- 100, 100A: parallax calculation unit
- 101: parallax search unit
- 102: higher-level reference parallax determination unit
- 103: parallax invalidity determination unit
- 201, 203: image region
- 202: epipolar line
- 501 to 503, 901: parallax

The invention claimed is:

1. An image processing device comprising:

a parallax calculation unit that obtains a parallax by comparing two images captured by two cameras, wherein the parallax calculation unit performs a first layer stereo matching processing for obtaining a first parallax in units of an image region of a first size by specifying an image block having the first size image region and having the highest similarity to a first image block provided in one image of the two images from a first search range determined based on a first search width determined in advance in the other image of the two images, and a second layer stereo matching processing for obtaining a second parallax in units of an image region of a second size by specifying an image block having the second size image region smaller than the first size and having the highest similarity to a second image block provided in one image of the two images from a second search range determined based on the first parallax and a second search width determined in advance in the other image of the two images, and expands the first search width or the second search range and performs a search when the image block having the highest similarity to the first image block exists at an end of the first search range, in the first layer stereo matching processing.

2. The image processing device according to claim 1, wherein when the search is performed by expanding the first search width or the second search range, an upper limit is set in advance to the first search width or the second search range.

3. The image processing device according to claim 1, wherein the parallax calculation unit terminates the search based on a point at which a similarity decreases along a search direction when performing the search by expanding the first search width or the second search range.

4. The image processing device according to claim 1, wherein the parallax calculation unit determines the first search width or the second search range based on which end of the first search range the image block with the highest similarity to the first image block has been found when the image block with the highest similarity exists at the end of the first search range, in the first layer stereo matching processing.

5. The image processing device according to claim 1, wherein the parallax calculation unit determines whether or not to expand the first search width or the second search range and performs a search, based on a size of the first image block.

6. The image processing device according to claim 1, wherein the parallax calculation unit determines whether or not to expand the first search width or the second search range and perform the search based on whether or not a difference in the similarity in the first search range is greater than a threshold determined in advance, in the search in the first layer stereo matching processing.

7. The image processing device according to claim 1, wherein the parallax calculation unit determines whether or not to expand the first search width or the second search range and perform the search based on whether or not a similarity of the image block with the highest similarity is different from the similarities of other image blocks in the search range by a value greater than a predetermined threshold, in the search in the first layer stereo matching processing.

8. The image processing device according to claim 1, wherein the parallax calculation unit determine whether or not to expand the first search width or the second search range and perform the search based on whether or not the first parallax obtained in the first layer stereo matching processing is greater than a threshold determined in advance.

9. The image processing device according to claim 1, wherein the parallax calculation unit determines whether or not to expand the first search width or the second search range and perform the search based on whether or not a luminance gradient in the image block is greater than a predetermined threshold.

10. The image processing device according to claim 1, wherein the parallax calculation unit performs the second layer stereo matching processing without outputting the first parallax as a result of the first layer stereo matching processing when a plurality of image blocks considered to be similar to the first image block exist, in the first layer stereo matching processing.

11. The image processing device according to claim 10, wherein the parallax calculation unit determines whether or not to output the first parallax based on whether or not the luminance gradient in the image block is greater than a threshold determined in advance.

12. An image processing method using an image processing device including a parallax calculation unit that obtains a parallax by comparing two images captured by two cameras, the method comprising:

performing, by the parallax calculation unit, a first layer stereo matching processing for obtaining a first parallax in units of an image region of a first size by specifying an image block having the first size image region and having the highest similarity to a first image block provided in one image of the two images from a first search range determined based on a first search width determined in advance in the other image of the two images, and a second layer stereo matching processing for obtaining a second parallax in units of an image region of a second size by specifying an image block having the second size smaller than the first size and having the highest similarity to a second image block provided in one image of the two images from a second search range determined based on the first parallax and a second search width determined in advance in the other image of the two images, wherein the parallax calculation unit expands the first search width or the second search range and performs a search when the image block having the highest similarity to the first image block exists at an end of the first search range, in the first layer stereo matching processing.

* * * * *